No. 881,197. PATENTED MAR. 10, 1908.
C. F. O'DELL & K. HAYNES.
EGG TESTER.
APPLICATION FILED SEPT. 25, 1907.
2 SHEETS—SHEET 2.
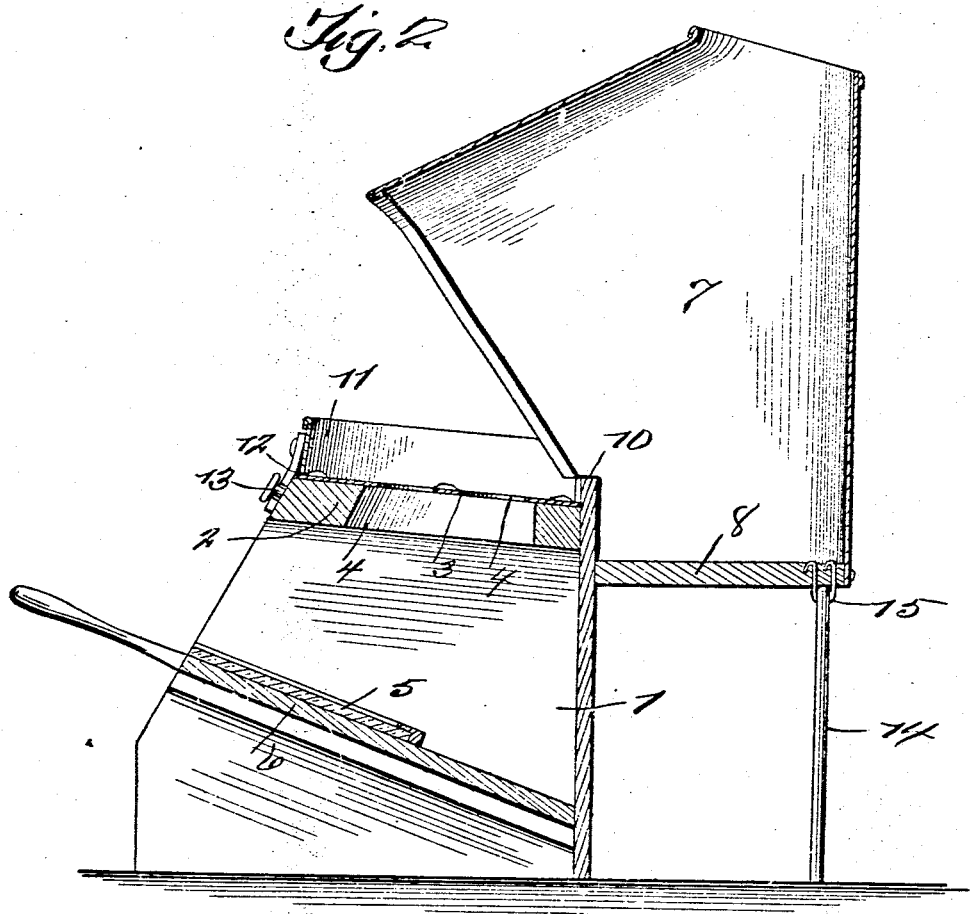

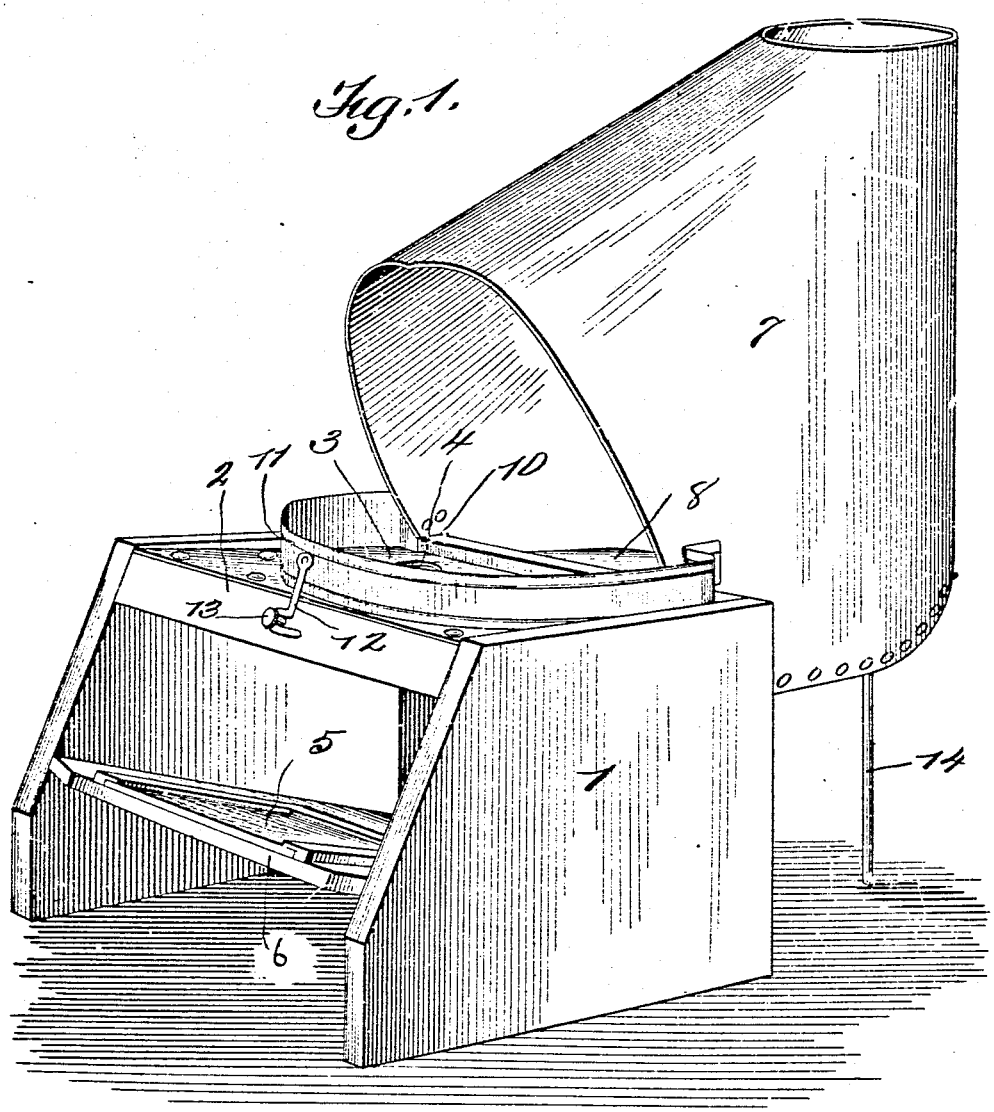

UNITED STATES PATENT OFFICE.

CHARLES F. O'DELL AND KATHERINE HAYNES, OF CEYLON, MINNESOTA.

EGG-TESTER.

No. 881,197.      Specification of Letters Patent.      Patented March 10, 1908.

Application filed September 25, 1907. Serial No. 394,475.

*To all whom it may concern:*

Be it known that we, CHARLES F. O'DELL and KATHERINE HAYNES, citizens of the United States, residing at Ceylon, in the county of Martin and State of Minnesota, have invented a new and useful Egg-Tester; and we do hereby declare the following to be a full, clear, and exact description of the invention, such as will enable others skilled in the art to which it appertains to make and use the same.

The invention relates to an apparatus for testing eggs, and has for its object to provide a simple, inexpensive and efficient device of this character, which will test the soundness of one or more eggs at a time.

In the drawings, Figure 1 is a perspective view of my egg testing apparatus. Fig. 2 is a vertical sectional view.

Referring to the drawings, 1 designates the frame or casing of the device which may be of any size desired and is provided with an egg top 2, which consists of a leather support 3, mounted thereon. The leather support 3 which is provided with apertures 4, is designed to afford a flexible support for the eggs. The device is also provided with a removable mirror 5 which is arranged at an inclination about the middle of the frame. The mirror support 6 extends outwardly and upwardly beyond the device, and may be used as a handle.

Mounted on the upper part of the frame 1, is a light reflecting hood 7 provided with a base portion 8, on which may be placed a lamp or other suitable illuminating device. The hood 7 is provided with a shoulder 10 which rests upon the upper corner of the frame 1. The hood is also provided with a band 11, which lies upon the top of frame 1 and is provided with a hook 12 which engages a lug 13 for locking said hood on the frame 1 as clearly shown in the drawing. The base 8 is further supported by an arm 14, which is pivoted as at 15 and which extends downwardly to the floor.

In operation eggs are placed over the apertures or perforations, and the light falling on the eggs will cast a shadow upon the mirror if the eggs are unsound. The soundness of the eggs is indicated by the clearness of the light that falls through them upon the mirror.

What is claimed.

An egg tester, comprising a casing having an opening in its top-portion and an upwardly and an outwardly inclined support in its lower portion, a reflector arranged upon said support at an angle to said top-portion and its opening, and a light reflecting hood having its bottom member opposed to the rear wall of said casing and otherwise supported in position in connection with said casing, said light-reflecting hood having extending forwardly from its lower portion, a band-like member resting upon and secured to the top of said casing, and a pliable egg support secured to the upper surface of said casing top, over the opening therein, and itself provided with a plurality of egg-engaging openings to allow of the reflection of the contents of the eggs placed in said latter openings, in said mirror below.

In testimony whereof we have signed our names to this specification in the presence of two subscribing witnesses.

CHARLES F. O'DELL.
           KATHERINE HAYNES.

Witnesses:
     E. J. BARNETT,
     J. J. HAYNES.